United States Patent [19]

Raghavan et al.

[11] Patent Number: 5,531,900

[45] Date of Patent: Jul. 2, 1996

[54] MODIFICATION OF POLYVINYLIDENE FLUORIDE MEMBRANE AND METHOD OF FILTERING

[75] Inventors: Srini Raghavan; Der'e Jan; Raghunath Chilkunda, all of Tuscon, Ariz.

[73] Assignee: University of Arizona, Tucson, Ariz.

[21] Appl. No.: 271,646

[22] Filed: Jul. 7, 1994

[51] Int. Cl.$^6$ .................................. B01D 71/34
[52] U.S. Cl. .................. 210/651; 210/654; 210/500.35; 210/500.42
[58] Field of Search .............................. 210/638, 500.35, 210/500.42, 651, 654, 490, 259

[56] References Cited

U.S. PATENT DOCUMENTS

| | | |
|---|---|---|
| 3,524,546 | 8/1970 | Hoehn et al. |
| 4,377,481 | 3/1983 | Takabhazy .................. 210/500.42 X |
| 5,137,633 | 8/1992 | Wang .................. 210/500.35 X |
| 5,246,586 | 9/1993 | Bah et al. .................. 210/638 |
| 5,282,971 | 2/1994 | Degen et al. |

OTHER PUBLICATIONS

Robert Rabinowitz and Ruth Marcus, "*Polymerization Of Vinylphosphonium Compounds*", Journal of Polymer Science: Part A. vol. 3, pp. 2063–2074 (1965).

Primary Examiner—Frank Spear
Attorney, Agent, or Firm—Bell, Seltzer, Park & Gibson

[57] ABSTRACT

There is provided a filter medium comprising a microporous polyvinylidene fluoride membrane and a polymer containing a positively charged organic phosphonium compound grafted to the membrane in a concentration sufficient to provide a surface of said membrane with a positive charge such that there is minimal susceptibility to the extraction of said polymer. The polymer may also contain an acrylate or methacrylate. There is also provided a method for ultrapurifying a liquid and an ultrapurifying system for water.

24 Claims, No Drawings

MODIFICATION OF POLYVINYLIDENE FLUORIDE MEMBRANE AND METHOD OF FILTERING

BACKGROUND OF THE INVENTION

(1) Field of the Invention

This invention relates to a modified polyvinylidene fluoride membrane for use in ultrafiltration and to methods of filtering. More particularly, this invention relates to polyvinylidene fluoride membranes having grafted thereto positively charged polymer for the removal of undesirable contaminants from liquids during filtering and to methods for using the charged membranes.

(2) Description of the Prior Art

Manufacturing processes use millions of gallons of ultrapure water every day in large-scale process applications such as the manufacture of semiconductor devices, chemicals, and pharmaceuticals. To minimize particulate contamination on semiconductor devices, the water is typically filtered to remove suspended contaminants. Microporous membranes are well-known for this purpose; however, such removal, while commonly used, is not totally successful.

Thus, selection of filter membranes for use in ultrapurification to remove contaminants from deionized water is important to contamination-free manufacturing. One type of membrane in widespread use is charge modified nylon membranes Which have good strength, flexibility, narrowly controlled pore size, minimal release of particulates, and high wettability in water but exhibit poor resistance to aggressive chemicals used in the semiconductor industry.

As mentioned, charged modified nylon membranes have been tried. For example, in U.S. Pat. No. 3,524,546 to Hoehn et al, there is described membranes of graft copolymers of nylon produced by grafting titratable acid groups on to the polymer chain. A preferred material for grafting onto the polymer is polymerizable organic acid, e.g. acrylic acid. A sufficient amount of grafting is said to be when the graft copolymer shows a grafted weight gain of acrylic acid of about 3%. The only methods described for performing such grafting are by high energy ionizing radiation or by the action of free radical generating catalysts. The grafted membranes are said to be physically strong, having exceptionally advantageous throughput rates when compared to known permeation membranes.

On the other hand, polyvinylidene fluoride based membrane filters, because of their inertness, have been finding increased application in the filtration of de-ionized water and other chemicals. Since polyvinylidene fluoride is hydrophobic, removal of macromolecular contaminants in ultrapure water, such as bacterial lipopolysaccharides and endotoxins which contain hydrophobic groups, is possible by hydrophobic absorption. However, hydrophobic absorption does not involve charge groups; thus, the removal mechanism is rather insensitive to pH of the medium.

Therefore it is desirable to incorporate a functional group that can develop a charge in liquids which may enhance the capacity of such membranes to remove charge contaminants by electrostatic absorption. Colloidal contaminant removal by electrostatic absorption mechanism relies on the nature of charge developed by the filtered material and the contaminants in a given liquid medium. Most common colloidal contaminants, such as silica and liposaccharides, are negatively charged in deionized water and in basic chemicals.

In developing filtering compositions, many different materials have been used to prepare filter media. For example, U.S. Pat. No. 5,282,971 to Degen et al. discloses positively charged microfilters having nylon or polyvinylidene membranes treated with a positively charged polymer containing quaternary ammonium compound which is useful in the manufacture of pharmaceutical compounds. The development of other positively charged compounds including polymerized phosphonium compounds dissolved in aqueous solutions into high molecular weight polymers using X-Rays is also known. R. Rabinowitz and R. Marcus, J. Polym. Sci., A3, 2063–2074 (1965).

Despite the wide variety of microporous filter media and attempts to modify the surface of the media, there remains a need for a hydrophilic filter medium that is suitable for use in deionized water and other liquid chemicals to remove impurities such as bacterial lipopolysaccharides and endotoxins while allowing for the passage of desirable positively charged species with the filtrates. The present invention provides such a filter medium and method for filtering.

It is an object of the present invention to provide a microporous filter medium that is hydrophilic and suitable for filtering deionized water.

Another object of the present invention is to provide a filter medium that has a positively charged surface with minimal susceptibility to the extraction of the agent that renders the membrane positively charged.

A further object of the present invention is to provide a method for filtering deionized water to remove macromolecular contaminants.

Yet another object of the present invention is to provide a method for the ultrapurification of water and chemicals using a polyvinylidene fluoride membrane having a polymer containing a charged organic phosphonium compound covalently bonded thereto by gamma radiation.

An even further object of this invention is to provide an ultrapurification system for water.

Other objects, features and advantages of the invention will be apparent from the following details of the invention as more fully described.

SUMMARY OF THE INVENTION

In accordance with these objects and the principles of this invention, it has been found that contaminants may be successfully removed from liquids using a filter medium comprising a microporous polyvinylidene fluoride membrane and a polymer containing positively charged organic phosphonium compounds covalently bonded to the membrane. The polymer is preferably a positively charged organic phosphonium compound preferably vinyltriphenyl phosphonium bromide. In another embodiment, the polymer comprises an organic phosphonium compound polymerized with an acrylate or methacrylate, preferably hydroxy ethyl methacrylate. The polymer is grafted to the membrane by gamma radiation to form covalent bonds.

It has been found that, surprisingly, that by adjusting the concentration of organic phosphonium compound and acrylate or methacrylate, a flat (positive) zeta potential-pH profile of the charged membranes of the present invention is obtained. This is a highly desirable characteristic for a membrane to remove negatively charged macromolecular and colloidal contaminants, such as bacterial lipopolysaccharides and endotoxins, from liquids.

DETAILED DESCRIPTION OF THE INVENTION

The present invention provides a filter medium of a microporous polyvinylidene fluoride membrane having a polymer grafted thereto. The polymer is made from an organic phosphonium charge modifying compound grafted to the membrane in a concentration sufficient to provide a surface of said membrane with a positive charge such that there is minimal susceptibility to the extraction of said polymer. The polymer may also include an acrylate or methacrylate to improve wettability of the modified membrane. It should be understood that while it is believed that the organic phosphonium compound either alone or together with an acrylate or methacrylate is grafted as a polymer, it should be understood that some or all of the grafting to the membrane may be in the monomer form. The invention also includes a method for filtering liquids through such a filter medium and a system for accomplishing the filtering.

The microporous membrane is formed of polyvinylidene fluoride (PVDF) using conventional techniques known in the art. Suitable membranes are commercially available from several sources such as Pall Corporation and Millipore. The microporous membrane may have any suitable pore size, depending upon the contaminant to be removed, preferably ranging from about 0.05 to about 5 μm, more preferably ranging from about 0.1 to about 0.5 μm.

The polymer containing charge modifying compound is any such compound in a concentration sufficient to provide a surface of the PVDF membrane with a positive charge such that there is minimal susceptibility to the extraction of the charged polymer. The polymer reduces the ability of the microporous membrane to adsorb macromolecular contaminants in ultrapure water, such as bacterial lipopolysaccharides and endotoxins which contain hydrophobic groups and preferably renders the microporous membrane hydrophilic.

A polymer containing a positively charged organic phosphonium compound may be prepared from any polymerizable ethylenically unsaturated monomer which either contains a phosphonium group or which is capable of being converted to such a group. A preferred monomer is vinyltriphenyl phosphonium bromide (97%) from Aldrich Chemical Company. It was found that vinyltriphenyl phosphonium bromide provides an excellent zeta potential at pH 4–10. The phosphonium monomer may be self-polymerized but is typically prepared together with a wettability modifying compound.

As noted, the polymer preferably is prepared from the organic phosphonium compound in conjunction with one or more polar, hydrogen-bonding, nonionic, polymerizable ethylenically unsaturated monomers. Such a monomer may be completely inert or may contain functional groups which confer additional desired properties or exercise control over the surface properties already conferred by the organic phosphonium groups, provided that these functional groups do not interfere with the functioning of the filter medium. Suitable additional monomers include polar, nonionic monomers such as hydroxyl-containing monomers, particularly acrylates and methacrylates, for example, hydroxypropyl acrylate (HPA), hydroxyethyl acrylate (HEA), diethylene glycol diacrylate (DEGDA), hydroxyethyl methacrylate (HEMA), polyethylene glycol dimethacrylate (PEGDM), hydroxypropyl methacrylate (HPMA), and diethylene glycol dimethacrylate (DEGDMA), which contain polar, hydrogen-bonding functionalities and tend to impart hydrophilicity to the microporous membrane. The monomers HPA and HEMA, most preferably HEMA, are used in conjunction with the quaternary ammonium group-containing monomer. The inclusion of a monomer having a hydrophobic moiety, such as methyl methacrylate, can be used, of course, to obtain precise control over the final hydrophilicity of the membrane by tempering the effect of monomers containing hydrophilic groups.

It is only required that the polymer contain sufficient organic phosphonium groups to overcome the negative potential inherent on the surface of the microporous membrane. The required amount may be achieved by forming a thin polymer coating containing a large proportion of phosphonium groups. It is undesirable to form a very thick coating on the microporous membrane because the polymer may partially block the pores of the membrane and reduce the permeability of the filter medium. Thus, it is desired that the polymer contain as high a proportion of organic phosphonium groups as possible so as to enable the polymer coating to be as thin as possible while still counteracting the negative potential inherent in the microporous membrane.

The filter medium of the present invention is preferably formed by contacting the microporous membrane with the monomers which polymerize to form the polymer containing organic phosphonium groups in such a way that the polymer is covalently bonded to the microporous membrane. More preferably, the microporous membrane is contacted with a grafting solution comprising a polymerizable ethylenically unsaturated monomer or monomers, at least some of which contain organic phosphonium groups, such that the monomer or monomers polymerize to form a polymer coating on all the fluid-contacting surfaces of the microporous membrane and then exposed to ionizing radiation. The concentration of organic phosphonium group-containing monomer in the grafting solution is about 0.5 weight % to about 3 weight % of the total solution, preferably about 1.0 weight % to about 2.0 weight % and the remainder of the solution is water. When the polymer includes an acrylate or methacrylate, it is present in an amount from 0.1 weight % to about 0.5 weight % of the grafting solution, preferably from about 0.1 weight % to about 0.2 weight %.

To form the grafting solution, the monomer or monomers may be dissolved in any solvent or combination of solvents which is capable of dissolving all of the monomers together and which does not interfere with the formation of the polymer coating on the microporous membrane. The preferred solvent is water. If the monomers are not fully soluble in water, an amount of a water-miscible inert organic cosolvent such as 2-methylpropan-2-ol may be added in an amount sufficient to enable complete dissolution of the monomers.

The polymer containing phosphonium groups is formed by exposing the microporous membrane to ionizing radiation in the presence of the monomer solution. Any source of ionizing radiation may be used, provided that the radiation is capable of initiating graft polymerization. Gamma radiation and electron beam radiation are preferred. Especially preferred is gamma radiation from a $^{60}$Co source. Irradiation at any dose rate is acceptable provided it enables formation of a membrane having the desired surface properties and the membrane is not damaged by the radiation. Dose rates from about to about 1 to about 1,000 kilorads/hr. and preferably from about 5 to about 100 kilorads/hr. may be used. Total doses in the range of from about 0.05 to about 5 megarads, more typically in the range 0.2 to 2 megarads, at a dose rate of 400 rads/min. are usually sufficient to effect the desired polymerization and bonding.

The microporous membrane may be contacted with the polymerizable monomer solution by any appropriate means, such as by immersion in the monomer solution. Alternatively, the monomer solution may be forced through the microporous membrane by the application of pressure across the membrane to initiate flow or to increase the efficiency of the wetting process. In any case, all the fluid contacting surface area of the microporous membrane should be in contact with an excess of the monomer solution during formation of the filter medium to ensure complete coverage of the surface with the grafted polymer.

After irradiation and polymerization, the filter medium is washed with water to remove polymeric debris that is not bonded to the membrane. Any means of washing which causes water to flow across the entire membrane surface is appropriate, provided that it is carried out sufficiently to remove all the unbound debris. Particularly effective for washing the filter medium is flowing deionized water through the membrane for about 5 hours at a flow rate of about 1/8 gallon per minute (gpm) for 10 square feet of membrane surface area.

After washing, the filter medium may be dewatered and/or dried and subjected to any further processing. Drying conditions of up to about 100° C. for up to about 14 hours have been found satisfactory, although less time is usually sufficient to effect the desired drying of the filter medium.

The modified filter membranes of this invention are especially useful as filter medium in ultrapure water treatment systems. Such systems may include a housing through which untreated or pretreated water passes. The water supply includes a water inlet and a water supply outlet communicating with said housing and defining a path of travel of the water from said inlet to said outlet. The system includes a filter medium of the type described herein positioned in the path of travel of the water. The filter medium may be in the form of a filter cartridge prepared using the present inventive filter medium, either unsupported or interleaved with support layers, particularly nonwoven support layers which serve as support and drainage layers, such as a plate and frame.

The following examples further illustrate the present invention and should not be construed as limiting its scope.

EXAMPLE 1

This example illustrates the preparation of one embodiment of the filter medium of the present invention. This example also compares the hydrophilicity of the filters of the present invention.

An aqueous solution containing 2 weight % vinyl triphenyl phosphonium bromide monomer and five strips of PVDC film (0.15 mm×60 mm×50 mm) having a mean pore size of 140 nm. was degassed in a glass tube and then sealed. The tube was then irradiated in a $^{60}$Co γ-ray facility. The total amount of irradiation was 0.61 Mrads at a dose rate of 400 rads/min., as measured by Fricke's dosimeter. After irradiation, the grafted samples of medium were washed in a deionized water trough to remove unreacted monomer, and dried at 100° C. for 10 minutes. The grafting of vinylphenyl phosphonium bromide onto PVDF was confirmed by infrared analysis.

The critical surface tension of the charge-modified and unmodified membranes was determined from the contact angles of IPA/water solutions measured using a Ram é-Hart contact angle goniometer. The surface tensions of IPA/water solutions were determined using a Cahn DCA 312 instrument.

The critical surface tension of wetting [calculated by extrapolating Cos (φ) vs. liquid surface tension plot to Cos (φ) of 1] of the modified membrane was ca 24 dynes/cm. while that of the unmodified membrane was about 20 dynes/cm.

EXAMPLE 2

This example illustrates zeta potential values of unmodified and charge-modified PVDF were determined as a function of solution pH. Membranes made according to the procedures of Example 1 were used and irradiated at differing levels were tested.

The zeta potential measurements were carried out using a streaming potential method. The set up consisted of a 3 liter PTFE reservoir, a valveless metering pump with a PTFE head (Fluid Metering Inc., Model QD1), a flow cell, a pressure transducer (Validyne DP 15–40) with a carrier demodulator, a high impedance electrometer (Keithley Model 614: input impedance $5\times10^{13}$ ohms) and PTFE valves and lines. The flow cell consisted of two PTFE chambers with a plate in between to hold 47 mm diameter membrane samples. Silver billet electrodes (Ingold) positioned on either side of the membrane were used to measure the streaming potential. These electrodes were chloridized in 1M HCl at a current of 0.0044 A for 40 min.

The streaming potential was measured at pressure drop (P) values ranging from 351 to 3515 kg/m$^2$ and the slope of the streaming potential ($E_s$) versus pressure drop plot was used to calculate the zeta potential ζ, according to the following equation:

$$\zeta = 4\pi\eta \frac{\kappa}{\epsilon} \times \frac{\Delta E_s}{\Delta P} \quad [1]$$

In the above equation, η, ε, κ, are the viscosity, dielectric constant and conductivity of the solution, respectively.

The charge-modified membrane were characterized by a positive zeta potential in the pH ranges from 4 to 9.3. The zeta Potential values of unmodified and charge-modified PVDF membranes are shown as a function of solution pH in the table below.

| Membrane | ZETA POTENTIAL pH | | | |
|---|---|---|---|---|
| Samples | 4 | 6 | 8 | 9 |
| Unmodified PVDF | −4 | −10 | −15 | −20 |
| PVDF + 2 wt % VPB[1], 0.61 Mrads | 30 | 29 | 29 | 25 |
| PVDF + 2 wt % VPB[1], 1.22 Mrads | 30 | 30 | 29 | 23 |

[1]VPB is vinyltriphenyl phosphonium bromide

These values were calculated from the measured streaming potential values using equation [1]. The membranes had to be prewetted with isopropyl alcohol (IPA) prior to making the measurements. The unmodified PVDF membrane exhibits negative zeta potential values at pH values larger than 4, and the charge-modified PVDF membranes show positive zeta potential in the pH range from 4 to 9. The positive zeta potential of the charge-modified PVDF membranes is due to the grafting of phosphonium groups. Based on the zeta potential data, it appears that the extent of charge modification is independent of total γ-ray dosage in the range 0.61–1.22 Mrads.

EXAMPLE 3

One of the requirements of a filter membrane to be used in an ultrapure water system is that it should not generate organic carbon compounds by leaching into the water and increase the level of total organic carbon (TOC). To characterize the compatibility of the modified membranes with DI water, TOG release tests were performed.

A filter with a diameter of 47 mm was tested in a special bypass line emanating from the main artery of the polishing loop of the water system. The flow rate in the main artery was 7500 ml/min (2 gpm), while the flow rate in the bypass line was 150 ml/min. The membranes were wetted with IPA and thoroughly rinsed with DI water prior to loading in the bypass loop. The tests for PVDF and charge-modified PVDF lasted 200 min. with TOC data points taken approximately every 7 to 8 min with an Anatel A-100P TOC analyzer in the outlet position.

The results of TOC measurements when PVDF and charge-modified PVDF membranes were installed in the bypass loop are shown in the table below.

| Membrane | TOC (ppb) Release Data* | | | | |
|---|---|---|---|---|---|
| | Minutes | | | | |
| Samples | 20 | 60 | 100 | 140 | 180 |
| Unmodified PVDF | 3.5 | 3 | 3 | 3 | 3 |
| Charge-modified PVDF | 4.25 | 3.6 | 3.5 | 3.5 | 3.5 |

*Background level, 3 ppb

This table also contains data-for TOC background level of the ultrapure water system when no membrane was present in the experimental set-up. The results show that the TOC level was 3.5 ppb after 20 minutes when an unmodified PVDF membrane was located in the system, but it decreased and reached a steady value of 3 ppb at about 70 min. On the other hand, the use of the charge-modified PVDF membrane resulted in an initial TOC level of 4.25 ppb after 20 minutes, but the TOC level decreased to about 3.5 ppb after about 80 min. It thus appears that the charge modifying compound is rather strongly grafted onto the surface of PVDF and leaches out less than 1 ppb of TOC levels in ultrapure water.

EXAMPLE 4

The conceived reaction scheme for the positive charge modification of PVDF membranes has improved the capacity of membranes to remove anionic compounds without compromising the stringent TOC requirements that should be met for use in ultrapure water systems. However, these modified membranes are still hydrophobic, and need prewetting with IPA prior to their use. To overcome the wettability problem, a hydrophilic acrylate monomer was copolymerized with the vinyl phosphonium compound.

This example shows the improved critical surface tension of mixed monomers grafted to a PVDF membrane. The modified PVDF membrane was grafted to a mixed polymer of 2 wight % vinyl triphenyl phosphonium bromide and 0.1 weight % of PEGDM 600 made according to the method described in Example 1. The surface tension was measured according to the procedure set forth in Example 1. The critical surface tension of wetting [calculated by extrapolating Cos ($\phi$) vs. liquid surface tension plot to Cos ($\phi$) of 1] of the modified membrane was ca. 35 dynes/cm while that of the unmodified membrane was about 20 dynes/cm. This implies that the wettability of the modified membranes of this invention are significantly improved.

EXAMPLE 5

This example illustrates the zeta potential compared to unmodified and charge-modified PVDF membranes made according to the procedures set forth in Example 1.

| Membrane | ZETA POTENTIAL | | | |
|---|---|---|---|---|
| | pH | | | |
| Samples | 4 | 6 | 8 | 9 |
| 1. Unmodified PVDF | −2 | −9 | −16 | −21 |
| 2. PVDF + 1% VPB[1] + 0.1% HEMA[2] | 40 | 38 | 34 | 31 |
| 3. PVDF + 2% VPB | 38 | 26 | 20 | 19 |
| 4. PVDF + 2% VPB + 1% HEMA[2] | 38 | 10 | −5 | −8 |
| 5. PVDF + 2% VPB + 2% HEMA[2] | 38 | −3 | −26 | −32 |
| 6. PVDF + 2% VPB + 0.2% HEMA[2] | 40 | 39 | 39 | 36 |

[1] VPB is vinyl triphenyl phosphonium bromide
[2] HEMA is a hydroxyethyl methacrylate The zeta potential significantly increased at pH with the grafting of vinyltriphenyl phosphonium bromide to the PVDF membrane. The zeta potential remained high at higher pH's when 0.1% and 0.2% by weight WMC was polymerized with vinyltriphenyl phosphonium bromide.

While the invention has been described and illustrated herein by references to specific materials, procedures and examples, it is understood that the invention is not restricted to the particular materials, combination of materials, and procedures selected for that purpose. Numerous variations of such details can be employed, as will be appreciated by those skilled in the art.

What is claimed is:

1. A filter medium comprising a microporous polyvinylidene fluoride membrane having a polymer containing vinyltriphenyl phosphonium bromide and a member of the group consisting of an acrylate and a methacrylate grafted thereto in a concentration sufficient to provide a surface of said membrane with a positive charge such that there is a minimal susceptibility to the extraction of said polymer.

2. The filter medium according to claim 1, wherein said member is a methacrylate.

3. The filter medium according to claim 1, wherein said polymer is prepared from an vinyltriphenyl phosphonium bromide and a hydroxylated acrylate or methacrylate.

4. The filter medium according to claim 1, wherein said acrylate is selected from the group consisting of hydroxypropyl acrylate, hydroxyethyl acrylate, and diethylene glycoldiacrylate, and said methacrylate is selected from the group consisting of hydroxyethyl methacrylate, polyethylene glycol dimethacrylate 600, hydroxypropyl methacrylate, and diethylene glycol dimethacrylate.

5. The filter medium according to claim 1, wherein said organic phosphonium compound is grafted to said membrane from a solution containing an amount from about 0.5 weight % to about 3.0 weight % of grafting solution of said compound.

6. The filter medium according to claim 1, wherein said organic phosphonium compound is grafted to said membrane from a solution containing an amount from about 0.5 weight % to about 3.0 weight % of grafting solution and said acrylate or methacrylate is present in an amount from about 0.1 weight % to about 0.5 weight % of grafting solution.

7. The filter medium according to claim 6, wherein said polymer is prepared from vinyltriphenyl phosphonium bromide and hydroxyethyl methacrylate.

8. The filter medium according to claim 1, wherein said membrane is contacted with a solution of monomer in water to prepare said polymer containing positively charged organic phosphonium groups and exposed to gamma radiation to graft said polymer to said membrane by covalent bonds.

9. A filter medium comprising a microporous polyvinylidene fluoride membrane and a polymer grafted thereto, said polymer grafted to said membrane from a solution comprising from about 1.0 weight % to about 2.0 weight % of vinyl triphenyl phosphonium bromide and from about 0.1 weight % to about 0.5 weight % of a hydroxylated acrylate or methacrylate, said weight % based on total weight of said grafting solution, and the remainder of said grafting solution being water.

10. A method for ultrapurifying a liquid having macromolecular contaminants therein comprising passing the liquid through a microporous polyvinylidene fluoride membrane having a polymer of vinyltriphenyl phosphonium bromide and a member of the group consisting of an acrylate and a methacrylate grafted thereto in a concentration sufficient to provide a surface of said membrane with a positive charge such that there is a minimal susceptibility to the extraction of the polymer.

11. The method according to claim 10, wherein said liquid is deionized water.

12. The method according to claim 10, wherein said member is a methacrylate.

13. The method according to claim 12, wherein polymer being grafted to said membrane from a solution containing said organic phosphonium compound in an amount from about 0.5 weight % to about 3.0 weight % and said acrylate or methacrylate in an amount from 0.1 weight % to 0.5 weight %, based on the total weight of said solution, and the remainder of said solution being water.

14. The method according to claim 10, wherein said acrylate or methacrylate is a hydroxylated acrylate or methacrylate.

15. The method according to claim 14, wherein said liquid is deionized water.

16. An ultrapure water treatment system comprising:

a housing;

a water supply including a water inlet and a water outlet communicating within said housing and defining a path of travel of the water from said inlet to said outlet;

irradiation means for irradiating water in the housing with UV light of wavelength of about 180 nm to about 190 nm, and a filter medium positioned within said path of travel of the water, said filter medium comprising a microporous polyvinylidene fluoride membrane having a polymer containing vinyl triphenyl phosphonium bromide and a member of the group consisting of an acrylate and a methacrylate grafted thereto in a concentration sufficient to provide a surface of said membrane with a positive charge such that there is minimal susceptibility to the extraction of said polymer.

17. The ultrapure water treatment system according to claim 16, wherein said phosphonium compound is vinyl triphenyl phosphonium bromide.

18. The ultrapure water treatment system according to claim 16, wherein said member is a methacrylate.

19. The ultrapure water treatment system according to claim 18, wherein said polymer being grafted to said membrane from a solution containing said organic phosphonium compound in an amount from about 0.5 weight % to about 3.0 weight % and said acrylate or methacrylate present in an amount from about 0.1 weight % to about 0.5 weight %, based on the total weight of said solution, and the remainder of said solution being water.

20. The ultrapure water treatment system according to claim 16, wherein said member is a hydroxylated acrylate or a hydroxylated methacrylate.

21. The ultrapure water treatment system according to claim 16, wherein said organic phosphonium compound is present in an amount from about 1% to about 3%.

22. The ultrapure water treatment system according to claim 16 including means for providing ozone into the water.

23. An ultrapure water treatment system comprising:

a housing, a water supply including a water inlet and a water outlet communication with said housing and defining a path of travel of the water from said inlet to said outlet, irradiation means for irradiating water in the housing with UV light of wavelength of about 180 nm to about 190 nm, and a filter medium positioned within said path of travel of the water, and between said housing and said water outlet or said water inlet or both, said filter medium comprising a microporous polyvinylidene fluoride membrane and a polymer, said polymer being grafted to said membrane from a solution containing from about 1 weight % to 2.0 weight % of a positively charged vinyl triphenyl phosphonium bromide and from about 0.1 weight % to about 0.5 weight % of a hydroxylated acrylate or methacrylate, said weight % based on the total weight of said solution, and the remainder of said solution being water.

24. The ultrapure water treatment system according to claim 23 including means for providing ozone into the water.

\* \* \* \* \*

UNITED STATES PATENT AND TRADEMARK OFFICE
CERTIFICATE OF CORRECTION

PATENT NO. : 5,531,900
DATED : July 2, 1996
INVENTOR(S) : Srini Raghavan, et al.

It is certified that error appears in the above-identified patent and that said Letters Patent is hereby corrected as shown below:

On the cover page, item [56]:, U.S. References, delete "Takabhazy" and insert --Jakabnazy-- therefor.

On the cover page, Column 2, delete "Bah" and insert --Ban--. therefor.

On the cover page, Column 2, Other Publications, after "Part A" delete the period (.) and insert a comma (,).

Column 1, line 30, delete "Which" and insert --which-- therefor.

Column 5, lines 59-60, delete Ram è-Hart" and insert --Ramè-Hart-- therefor.

Column 6, line 33, delete "Potential" and insert --potential-- therefor.

Columns 6, 7 and 8, in the Tables, "Membrane Samples" should be single spaced in the sub-headings.

Column 7, line 1, delete "TOG" and insert --TOC-- therefor.

UNITED STATES PATENT AND TRADEMARK OFFICE
CERTIFICATE OF CORRECTION

PATENT NO. : 5,531,900
DATED : July 2, 1996
INVENTOR(S) : Srini Raghavan, et al.

It is certified that error appears in the above-indentified patent and that said Letters Patent is hereby corrected as shown below:

Column 7, line 27, delete "data-for" and insert --data for--.

Signed and Sealed this

Twenty-eighth Day of January, 1997

Attest:

BRUCE LEHMAN

*Attesting Officer*    *Commissioner of Patents and Trademarks*